(12) United States Patent
Rodriguez et al.

(10) Patent No.: US 11,635,074 B2
(45) Date of Patent: *Apr. 25, 2023

(54) COVER FOR FLUID SYSTEMS AND RELATED METHODS

(71) Applicant: BJ Energy Solutions, LLC, Houston, TX (US)

(72) Inventors: Guillermo Rodriguez, Houston, TX (US); Heber Martinez, Houston, TX (US); Ricardo Rodriguez-Ramon, Houston, TX (US); Tony Yeung, Houston, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,517

(22) Filed: Jul. 23, 2021

(65) Prior Publication Data
US 2021/0355937 A1   Nov. 18, 2021

Related U.S. Application Data

(63) Continuation of application No. 15/929,652, filed on May 14, 2020.
(Continued)

(51) Int. Cl.
*F04B 53/16* (2006.01)
*E21B 43/26* (2006.01)
*F16J 15/02* (2006.01)

(52) U.S. Cl.
CPC .............. *F04B 53/16* (2013.01); *E21B 43/26* (2013.01); *F16J 15/021* (2013.01)

(58) Field of Classification Search
CPC .. F04B 1/00; F04B 53/16; F04B 47/02; E21B 43/26; F16J 15/00; F16J 15/02;
(Continued)

(56) References Cited

U.S. PATENT DOCUMENTS

| 1,716,049 A | 6/1929 | Greve |
| 1,726,633 A | 9/1929 | Smith |

(Continued)

FOREIGN PATENT DOCUMENTS

| AU | 9609498 | 7/1999 |
| AU | 737970 | 9/2001 |

(Continued)

OTHER PUBLICATIONS

US 11,459,865 B2, 10/2022, Cui et al. (withdrawn)
(Continued)

*Primary Examiner* — Philip E Stimpert
(74) *Attorney, Agent, or Firm* — Womble Bond Dickinson (US) LLP

(57) ABSTRACT

Embodiments of a high-pressure, high power, reciprocating positive displacement fluid pumping system and methods are included. The system may include a high-pressure, high power, reciprocating positive displacement pump including a pump plunger, a fluid end block assembly, and a fluid cover. The fluid end block assembly may include a fluid end block body, a suction port, a discharge port, a pump bore positioned in and extending through the fluid end block body, and a fluid chamber positioned in the fluid end block body and in fluid communication with each of the suction port, the discharge port, and the pump bore. The fluid chamber has an open end portion, and the pump plunger may be positioned to move in the pump bore to pressurize one or more fluids in the fluid chamber. The fluid cover includes a monolithic body having a first portion and a second portion, the first portion being received in the open end portion and sealably engaged with the fluid end block body, the second portion being mechanically connected to the fluid end block body.

13 Claims, 12 Drawing Sheets

Related U.S. Application Data

(60) Provisional application No. 62/704,476, filed on May 12, 2020, provisional application No. 62/704,462, filed on May 12, 2020.

(58) Field of Classification Search
CPC ........ F16J 15/021; F16J 55/11; F16J 55/1108; F16L 55/11; F16L 55/1108
See application file for complete search history.

(56) References Cited

U.S. PATENT DOCUMENTS

| | | | |
|---|---|---|---|
| 2,178,662 A | 11/1939 | Lars | |
| 2,427,638 A | 9/1947 | Vilter | |
| 2,498,229 A | 2/1950 | Adler | |
| 2,535,703 A | 12/1950 | Smith et al. | |
| 2,572,711 A | 10/1951 | Fischer | |
| 2,820,341 A | 1/1958 | Amann | |
| 2,868,004 A | 1/1959 | Runde | |
| 2,940,377 A | 6/1960 | Darnell et al. | |
| 2,947,141 A | 8/1960 | Russ | |
| 2,956,738 A | 10/1960 | Rosenschold | |
| 3,068,796 A | 12/1962 | Pfluger et al. | |
| 3,191,517 A | 6/1965 | Solzman | |
| 3,257,031 A | 6/1966 | Dietz | |
| 3,274,768 A | 9/1966 | Klein | |
| 3,378,074 A | 4/1968 | Kiel | |
| 3,382,671 A | 5/1968 | Ehni, III | |
| 3,401,873 A | 9/1968 | Privon | |
| 3,463,612 A | 8/1969 | Whitsel | |
| 3,496,880 A | 2/1970 | Wolff | |
| 3,550,696 A | 12/1970 | Kenneday | |
| 3,586,459 A | 6/1971 | Zerlauth | |
| 3,632,222 A | 1/1972 | Cronstedt | |
| 3,656,582 A | 4/1972 | Alcock | |
| 3,667,868 A | 6/1972 | Brunner | |
| 3,692,434 A | 9/1972 | Schnear | |
| 3,739,872 A | 6/1973 | McNair | |
| 3,757,581 A | 9/1973 | Mankin | |
| 3,759,063 A | 9/1973 | Bendall | |
| 3,765,173 A | 10/1973 | Harris | |
| 3,771,916 A | 11/1973 | Flanigan et al. | |
| 3,773,438 A | 11/1973 | Hall et al. | |
| 3,786,835 A | 1/1974 | Finger | |
| 3,791,682 A | 2/1974 | Mitchell | |
| 3,796,045 A | 3/1974 | Foster | |
| 3,814,549 A | 6/1974 | Cronstedt | |
| 3,820,922 A | 6/1974 | Buse et al. | |
| 3,847,511 A | 11/1974 | Cole | |
| 3,866,108 A | 2/1975 | Yannone | |
| 3,875,380 A | 4/1975 | Rankin | |
| 3,963,372 A | 6/1976 | McLain et al. | |
| 4,010,613 A | 3/1977 | McInerney | |
| 4,019,477 A | 4/1977 | Overton | |
| 4,031,407 A | 6/1977 | Reed | |
| 4,050,862 A | 9/1977 | Buse | |
| 4,059,045 A | 11/1977 | McClain | |
| 4,086,976 A | 5/1978 | Holm et al. | |
| 4,117,342 A | 9/1978 | Melley, Jr. | |
| 4,173,121 A | 11/1979 | Yu | |
| 4,204,808 A | 5/1980 | Reese et al. | |
| 4,209,079 A | 6/1980 | Marchal et al. | |
| 4,209,979 A | 7/1980 | Woodhouse et al. | |
| 4,222,229 A | 9/1980 | Uram | |
| 4,269,569 A | 5/1981 | Hoover | |
| 4,311,395 A | 1/1982 | Douthitt et al. | |
| 4,330,237 A | 5/1982 | Battah | |
| 4,341,508 A | 7/1982 | Rambin, Jr. | |
| 4,357,027 A | 11/1982 | Zeitlow | |
| 4,383,478 A | 5/1983 | Jones | |
| 4,402,504 A | 9/1983 | Christian | |
| 4,430,047 A | 2/1984 | Ilg | |
| 4,442,665 A | 4/1984 | Fick | |
| 4,457,325 A | 7/1984 | Green | |
| 4,470,771 A | 9/1984 | Hall et al. | |
| 4,483,684 A | 11/1984 | Black | |
| 4,505,650 A | 3/1985 | Hannett et al. | |
| 4,574,880 A | 3/1986 | Handke | |
| 4,584,654 A | 4/1986 | Crane | |
| 4,620,330 A * | 11/1986 | Izzi, Sr. .................. F16L 25/14 285/915 |
| 4,672,813 A | 6/1987 | David | |
| 4,754,607 A | 7/1988 | Mackay | |
| 4,782,244 A | 11/1988 | Wakimoto | |
| 4,796,777 A | 1/1989 | Keller | |
| 4,869,209 A | 9/1989 | Young | |
| 4,913,625 A | 4/1990 | Gerlowski | |
| 4,983,259 A | 1/1991 | Duncan | |
| 4,990,058 A | 2/1991 | Eslinger | |
| 5,032,065 A | 7/1991 | Yamamuro | |
| 5,135,361 A | 8/1992 | Dion | |
| 5,167,493 A | 12/1992 | Kobari | |
| 5,245,970 A | 9/1993 | Iwaszkiewicz et al. | |
| 5,291,842 A * | 3/1994 | Sallstrom ............ F16L 55/1108 111/127 |
| 5,326,231 A | 7/1994 | Pandeya | |
| 5,362,219 A * | 11/1994 | Paul ...................... F02B 75/065 418/61.2 |
| 5,511,956 A | 4/1996 | Hasegawa | |
| 5,537,813 A | 7/1996 | Davis et al. | |
| 5,553,514 A | 9/1996 | Walkowc | |
| 5,560,195 A | 10/1996 | Anderson et al. | |
| 5,586,444 A | 12/1996 | Fung | |
| 5,622,245 A | 4/1997 | Reik | |
| 5,626,103 A | 5/1997 | Haws et al. | |
| 5,634,777 A | 6/1997 | Albertin | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,720,598 A | 2/1998 | de Chizzelle | |
| 5,761,084 A | 6/1998 | Edwards | |
| 5,811,676 A | 9/1998 | Spalding et al. | |
| 5,839,888 A | 11/1998 | Harrison | |
| 5,846,062 A | 12/1998 | Yanagisawa et al. | |
| 5,875,744 A | 3/1999 | Vallejos | |
| 5,983,962 A | 11/1999 | Gerardot | |
| 5,992,944 A | 11/1999 | Hara | |
| 6,041,856 A | 3/2000 | Thrasher et al. | |
| 6,050,080 A | 4/2000 | Horner | |
| 6,067,962 A | 5/2000 | Bartley et al. | |
| 6,071,188 A | 6/2000 | O'Neill et al. | |
| 6,074,170 A | 6/2000 | Bert et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,230,481 B1 | 5/2001 | Jahr | |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,401,472 B2 | 6/2002 | Pollrich | |
| 6,530,224 B1 | 3/2003 | Conchieri | |
| 6,543,395 B2 | 4/2003 | Green | |
| 6,655,922 B1 | 12/2003 | Flek | |
| 6,669,453 B1 | 12/2003 | Breeden | |
| 6,765,304 B2 | 7/2004 | Baten et al. | |
| 6,786,051 B2 | 9/2004 | Kristich et al. | |
| 6,832,900 B2 | 12/2004 | Leu | |
| 6,851,514 B2 | 2/2005 | Han et al. | |
| 6,859,740 B2 | 2/2005 | Stephenson et al. | |
| 6,901,735 B2 | 6/2005 | Lohn | |
| 6,962,057 B2 | 11/2005 | Kurokawa et al. | |
| 7,007,966 B2 | 3/2006 | Campion | |
| 7,047,747 B2 | 5/2006 | Tanaka | |
| 7,065,953 B1 | 6/2006 | Kopko | |
| 7,143,016 B1 | 11/2006 | Discenzo et al. | |
| 7,222,015 B2 | 5/2007 | Davis et al. | |
| 7,281,519 B2 | 10/2007 | Schroeder | |
| 7,388,303 B2 | 6/2008 | Seiver | |
| 7,404,294 B2 | 7/2008 | Sundin | |
| 7,442,239 B2 | 10/2008 | Armstrong et al. | |
| 7,524,173 B2 | 4/2009 | Cummins | |
| 7,545,130 B2 | 6/2009 | Latham | |
| 7,552,903 B2 | 6/2009 | Dunn et al. | |
| 7,563,076 B2 | 7/2009 | Brunet et al. | |

(56) References Cited

U.S. PATENT DOCUMENTS

| | | |
|---|---|---|
| 7,563,413 B2 | 7/2009 | Naets et al. |
| 7,574,325 B2 | 8/2009 | Dykstra |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Hockner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy |
| 8,336,631 B2 | 12/2012 | Shampine et al. |
| 8,388,317 B2 | 3/2013 | Sung |
| 8,414,673 B2 | 4/2013 | Raje et al. |
| 8,469,826 B2 | 6/2013 | Brosowske |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,714,253 B2 | 5/2014 | Sherwood et al. |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 * | 7/2014 | Blume .................. F04B 53/162 417/568 |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sørensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |
| 10,196,258 B2 | 2/2019 | Kalala et al. |

(56) References Cited

U.S. PATENT DOCUMENTS

| | | |
|---|---|---|
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1 | 1/2021 | Yeung et al. |
| 10,900,475 B2 | 1/2021 | Weightman et al. |
| 10,907,459 B1 | 2/2021 | Yeung et al. |
| 10,927,774 B2 | 2/2021 | Cai et al. |
| 10,927,802 B2 | 2/2021 | Oehring |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,961,995 B2 | 3/2021 | Mayorca |
| 10,982,523 B1 | 4/2021 | Hill et al. |
| 10,989,019 B2 | 4/2021 | Cai et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B1 | 5/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,068,455 B2 | 7/2021 | Shabi et al. |
| 11,085,281 B1 | 8/2021 | Yeung et al. |
| 11,085,282 B2 | 8/2021 | Mazrooee et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,006 B1 | 10/2021 | Zhang et al. |
| 11,168,681 B2 | 11/2021 | Boguski |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,428,165 B2 | 8/2022 | Yeung et al. |
| 11,441,483 B2 | 9/2022 | Li et al. |
| 11,448,122 B2 | 9/2022 | Feng et al. |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung |
| 11,519,395 B2 | 12/2022 | Zhang et al. |
| 11,519,405 B2 | 12/2022 | Deng et al. |
| 11,530,602 B2 | 12/2022 | Yeung et al. |
| 11,549,349 B2 | 1/2023 | Wang et al. |
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2 | 1/2023 | Yeung et al. |
| 11,572,775 B2 | 2/2023 | Mao et al. |
| 11,575,249 B2 | 2/2023 | Ji et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |
| 2004/0016245 A1 | 1/2004 | Pierson |
| 2004/0074238 A1 | 4/2004 | Wantanabe et al. |
| 2004/0076526 A1* | 4/2004 | Fukano ............... F04B 43/04 417/212 |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |

(56) References Cited

U.S. PATENT DOCUMENTS

| | | |
|---|---|---|
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0023973 A1 | 2/2012 | Mayorca |
| 2012/0048242 A1 | 3/2012 | Surnilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1* | 10/2014 | Marette ................ F04B 49/22 417/437 |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0248034 A1 | 8/2017 | Dzieciol et al. |
| 2017/0248208 A1 | 8/2017 | Tamura |

(56) References Cited

U.S. PATENT DOCUMENTS

| | | |
|---|---|---|
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1* | 11/2018 | Bayyouk ............... F04B 1/0452 |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meek et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |

(56) References Cited

U.S. PATENT DOCUMENTS

| | | |
|---|---|---|
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |

FOREIGN PATENT DOCUMENTS

| | | |
|---|---|---|
| CA | 2043184 | 8/1994 |
| CA | 2829762 | 9/2012 |
| CA | 2737321 | 9/2013 |
| CA | 2876687 A1 | 5/2014 |
| CA | 2693567 | 9/2014 |
| CA | 2964597 | 10/2017 |
| CA | 2876687 C | 4/2019 |
| CA | 3138533 | 11/2020 |
| CA | 2919175 | 3/2021 |

(56) References Cited

FOREIGN PATENT DOCUMENTS

| | | |
|---|---|---|
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | PCT/CN2012/074945 | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |

(56) References Cited

FOREIGN PATENT DOCUMENTS

| | | | |
|---|---|---|---|
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |

(56) References Cited

FOREIGN PATENT DOCUMENTS

| | | | |
|---|---|---|---|
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |

(56) References Cited

FOREIGN PATENT DOCUMENTS

| | | |
|---|---|---|
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 A1 * | 12/2010 ............ B21D 39/06 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | 2013185399 | 12/2013 |
| WO | 2015158020 | 10/2015 |
| WO | 2016/014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |

(56) References Cited

FOREIGN PATENT DOCUMENTS

| | | |
|---|---|---|
| WO | 2021038604 | 3/2021 |
| WO | 2021041783 | 3/2021 |

OTHER PUBLICATIONS

US 11,555,493 B2, 01/2023, Chang et al. (withdrawn)
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. WeirSPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.
HCI JET Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (SOLAR Division International Harvester Co.), Modern Industrial Gas Turbines for the Oil Field American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PIkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.

(56) References Cited

OTHER PUBLICATIONS

2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.co m/news/oil-gas/a/124883/Turbine_Technology_Powers_Green_Field_ MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.
ResearchGate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.

Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, Ge Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., Electric Power Generation Potential Based on Waste Heat and Geothermal Resources in South Africa, pangea stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
AFGlobal Corporation, Durastim Hydraulic Fracturing Pump, A Revolutionary Design for Continuous Duty Hydraulic Fracturing, 2018.
De Gevigney et al., "Analysis of no-load dependent power losses in a planetary gear train by using thermal network method", International Gear Conference 2014: Aug. 26-28, 2014, Lyon, pp. 615-624.
Special-Purpose Couplings for Petroleum, Chemical, and Gas Industry Services, API Standard 671 (4th Edition) (2010).

(56) References Cited

OTHER PUBLICATIONS

The Application of Flexible Couplings for Turbomachinery, Jon R.Mancuso et al., Proceedings of the Eighteenthturbomachinery Symposium (1989).

Pump Control With Variable Frequency Drives, Kevin Tory, Pumps & Systems: Advances in Motors and Drives, Reprint from Jun. 2008.

Fracture Design and Stimulation, Mike Eberhard, P.E., Wellconstruction & Operations Technical Workshop Insupport of the EPA Hydraulic Fracturing Study, Mar. 10-11, 2011.

General Purpose vs. Special Purpose Couplings, Jon Mancuso, Proceedings of the Twenty-Third Turbomachinerysymposium (1994).

Overview of Industry Guidance/Best Practices on Hydraulic Fracturing (HF), American Petroleum Institute, © 2012.

API Member Companies, American Petroleum Institute, WaybackMachine Capture, https://web.archive.org/web/20130424080625/http://api.org/globalitems/globalheaderpages/membership/api-member-companies, accessed Jan. 4, 2021.

API's Global Industry Services, American Petroleum Institute, © Aug. 2020.

About API, American Petroleum Institute, https://www.api.org /about, accessed Dec. 30, 2021.

About API, American Petroleum Institute, WaybackMachine Capture, https://web archive.org/web/20110422104346 / http://api.org/aboutapi/, captured Apr. 22, 2011.

Publications, American Petroleum Institute, WaybackMachine Capture, https://web.archive.org/web/20110427043936 / http://www.api.org:80/Publications/, captured Apr. 27, 2011.

Procedures for Standards Development, American Petroleum Institute, Third Edition (2006).

WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.

2011 Publications and Services, American Petroleum Institute (2011). Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.

IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input_doc _number=671&input_doc_title=&document_name=API%20STD%20671&item_s_key=00010669&item_key_date=890331&origin=DSSC, accessed Dec. 30, 2021.

"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.

International Search Report and Written Opinion for PCT/US2022/030647, dated Oct. 7, 2022.

Dziubak, Tadeusz, "Experimental Studies of Dust Suction Irregularity from Multi-Cyclone Dust Collector of Two-Stage Air Filter", Energies 2021, 14, 3577, 28 pages.

Final written decision of PGR2021-00102 dated Feb. 6, 2023.

Final written decision of PGR2021-00103 dated Feb. 6, 2023.

Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.

\* cited by examiner

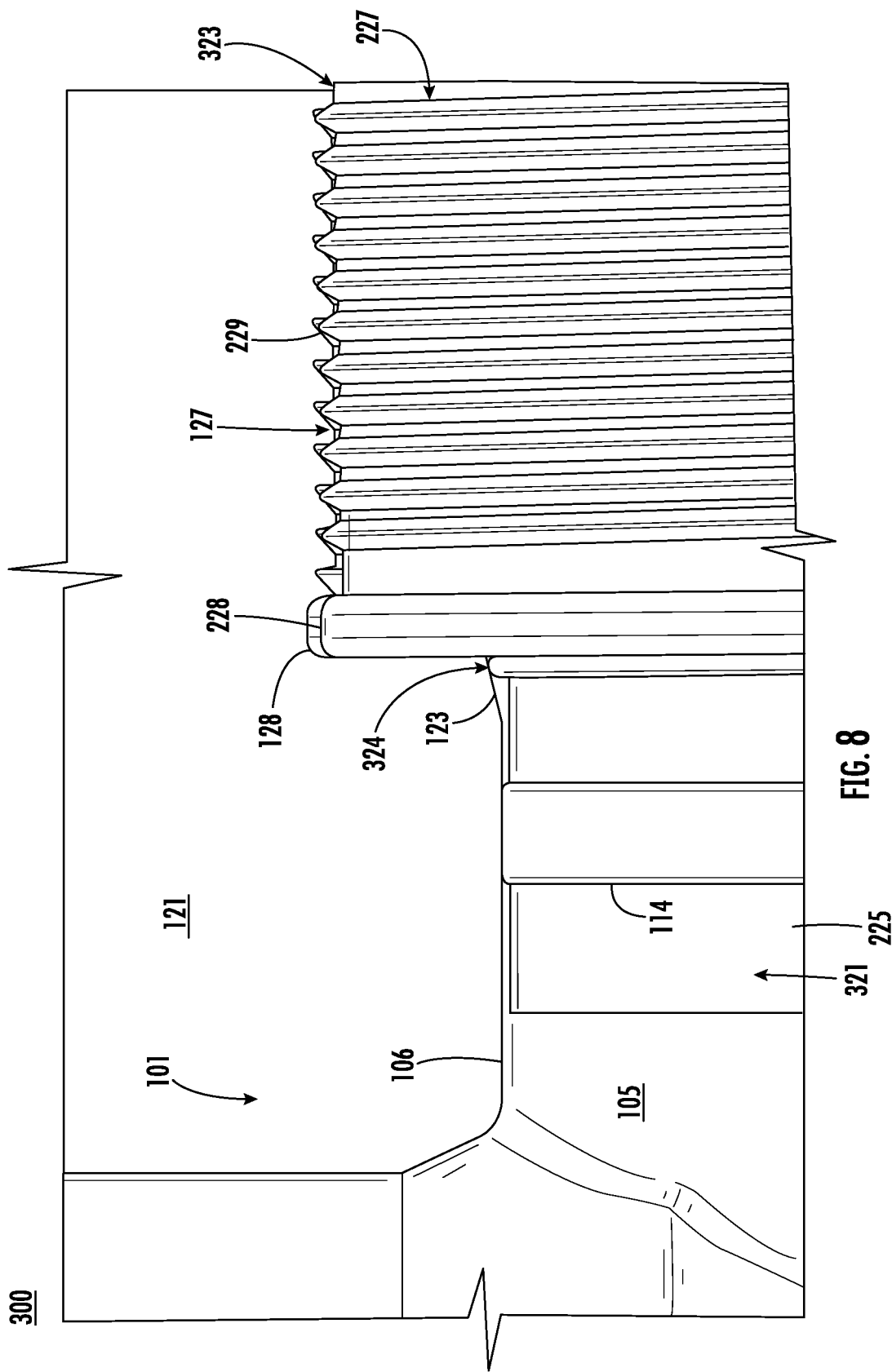

COVER FOR FLUID SYSTEMS AND RELATED METHODS

PRIORITY CLAIM

This is a continuation of U.S. Non-Provisional application Ser. No. 15/929,652, filed May 14, 2020, titled "COVER FOR FLUID SYSTEMS AND RELATED METHODS," which claims priority to and the benefit of, U.S. Provisional Application No. 62/704,462, filed May 12, 2020, titled "COVER FOR FLUID SYSTEMS AND RELATED METHODS," and U.S. Provisional Application No. 62/704,476, filed May 12, 2020, titled "COVER FOR FLUID SYSTEMS AND RELATED METHODS," the disclosures of which are incorporated herein by reference in their entireties.

BACKGROUND

The present disclosure generally relates to pressurized fluid systems, fluid end covers, and methods, for example, high pressure single acting reciprocating pumping systems and methods such as those that include hydraulic fracturing single acting reciprocating pumps. Specifically, the present disclosure relates to a fluid cover for a fluid end block assembly of hydraulic fracturing pumping systems.

Hydraulic fracturing often is used to produce oil and gas in an economic manner from low permeability reservoir rocks, such as shale. Hydraulic fracturing restores or enhances productivity of a well by creating a conductive flow path of hydrocarbons between the reservoir rock and a wellbore. During hydraulic fracturing, a fluid initially is pumped under high pressure to fracture rock in a reservoir formation and open a flow channel. Thereafter, a proppant-carrying fluid, e.g., a fluid that comprises proppant in the form of granular solid and/or semi-solid components, e.g., sand, ceramics, is pumped to continue opening and widening the flow channel while suspending proppant inside it. The proppant thus keeps the flow path opened for the hydrocarbons to flow.

Hydraulic fracturing treatments may be performed using single acting reciprocating fracturing pumps to deliver fluids at a high pressure, specifically, above the fracture pressure of the rock in a reservoir formation. These fracturing pumps are of a type referred to as reciprocating plunger pumps. Such pumps may have multiple pumps, for example, 3 or 5 plungers to form "triplex" and "quintuplex" pumps, respectively. In such pumps, one or more plungers moves linearly back and forth in a cylindrical bore, traveling in and out of a pump fluid chamber. The fluid chamber is in communication with a suction or intake port and discharge port. Each port may include additional fluid handling components, for example, springs and valves (such as a one-way valve).

In this regard, fluid enters the chamber through the suction port as the plunger withdraws from the chamber. It is then pumped out of the chamber through the discharge port as the plunger enters the chamber.

The plungers are part of what is generally referred to as the fluid end of the pumping system, a major component of which is a pump housing or fluid end block assembly. Accordingly, the fluid end block assembly may include passages or bores, e.g., cylindrical bores, in which the plungers travel, and within which valves, suction and discharge ports, fluid covers and other closures, etc., may be positioned.

The cyclic movement of the plungers may forcibly pressurize fluids inside the fluid end block assembly of the pumping system. The rugged environments, high pressure of the fluid, and high power operations of the pumps causes fluid ends to become damaged, broken, and unusable, may decrease the usable life of the fluid ends, and may cause operational downtime or increased costs associated with pumping system operations at a well site.

SUMMARY

In view of the foregoing, there is an ongoing need for enhanced pumping system components and methods more suitable for use in the fluid end block assembly of a pumping system when being used in the associated rugged environments, as well as for high pressure and high power operations.

According to one embodiment of the disclosure, a high-pressure, high power, reciprocating positive displacement fluid pumping system may include a high-pressure, high power, reciprocating positive displacement pump having a pump plunger, a fluid end block assembly, and a fluid cover. The fluid end block assembly, for example, may include a fluid end block body, a suction port, a discharge port, a pump bore positioned in and extending through the fluid end block body, and a fluid chamber positioned in the fluid end block body and in fluid communication with each of the suction port, the discharge port, and the pump bore. The fluid chamber has an open end portion, and the pump plunger is positioned to move in the pump bore to pressurize one or more fluids in the fluid chamber. An embodiment of the fluid cover, for example, may have a monolithic body including a first portion and a second portion. The first portion may be received in the open end portion and sealably be engaged with the fluid end block body. The second portion may be connected mechanically to the fluid end block body. The fluid cover may include a shoulder that is positioned between the first portion and the second portion. The shoulder may be engaged with the fluid block end body to seal the open end portion. In some embodiments, the shoulder may interact with the open end portion to align the fluid cover with the open end portion.

According to another embodiment of the disclosure, a fluid end block assembly for a high-pressure, high power, reciprocating positive displacement fluid pumping system may include a fluid end block body, a pump bore positioned in and extending through the fluid end block body, a plurality of ports including a suction port and a discharge port which collectively provide access to and from the pump bore, and a fluid chamber positioned in the fluid end block body. The fluid chamber may be positioned in fluid communication with each of the suction port, the discharge port, and the pump bore. The fluid chamber, for example, has an open end portion, and the pump bore may be positioned to receive a movable pump plunger to pressurize one or more fluids when located in the fluid chamber. A fluid cover may be connected to the fluid end block body, and the fluid cover may include a monolithic body having a first portion and a second portion. The first portion may be received in the open end portion and may be configured to align the fluid cover with the open end portion. The second portion may be connected mechanically to the fluid end block body.

According to yet another embodiment of the disclosure, a fluid cover for being sealably engaged with a fluid end block assembly of a high-pressure, high power, reciprocating positive displacement fluid pumping system may include a monolithic body with a first portion and a second portion. The first portion, for example, may be received in an open end portion of a fluid chamber of the fluid end block assembly and sealably may be engaged with the fluid end block assembly. The first portion may be configured to engage the open end portion of the fluid chamber to align the fluid cover with the open end portion. The second portion may be connected mechanically to the fluid end block assembly.

An embodiment of the disclosure also provides a method of operating a high-pressure, high power, reciprocating positive displacement fluid pumping system that includes obtaining a fluid end block assembly that has a fluid end block body, suction port, a discharge port, a pump bore positioned in and extending through the fluid end block body, and a fluid chamber positioned in the fluid end block body and in fluid communication with each of the suction port, the discharge port, and the pump bore. The fluid chamber may have an open end portion. The method further may include obtaining a high-pressure, high power, reciprocating positive displacement pump that has a pump plunger and fluidly connecting the pump to the fluid end block assembly. The method may include aligning a fluid cover with the fluid end block by inserting a first portion of the fluid cover into the open end portion. The first portion may engage the open end portion to align the fluid cover with the fluid end block. The fluid cover may include a monolithic body including the first portion and a second portion. The method further includes sealably connecting the fluid cover to the fluid end block by mechanically connecting the second portion to the fluid end block body. The method further may include operating the pump. The operating of the pump includes moving the pump plunger in the pump bore to pressurize one or more fluids in the fluid chamber.

An embodiment of the disclosure also provides a method of assembly a fluid pumping system that includes inserting a first portion of a fluid cover into an open end portion of a fluid end block assembly and mechanically connecting a second portion of the fluid cover to the open end portion. The first portion may engage the fluid end block assembly to align the fluid cover with the open end portion. The fluid cover may comprise a monolithic body having the first and second portion. Mechanically connecting the second portion of the fluid cover may include the first portion sealing the open end portion of the fluid end block.

Those skilled in the art will appreciate the benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

FIG. 8 is a sectional view of the integrated fluid cover of FIG. 7A sealably coupled with a fluid end block assembly of a fluid pumping system according to an embodiment of the disclosure.

Corresponding parts are designated by corresponding reference numbers throughout the drawings.

DETAILED DESCRIPTION

The embodiments of the present disclosure are directed to pressurized fluid systems, for example, high pressure single acting reciprocating pumping systems such as those that include hydraulic fracturing single acting reciprocating pumps. In particular, the embodiments of the present disclosure are directed to fluid covers for use with such pressurized fluid systems.

Figure 1A:
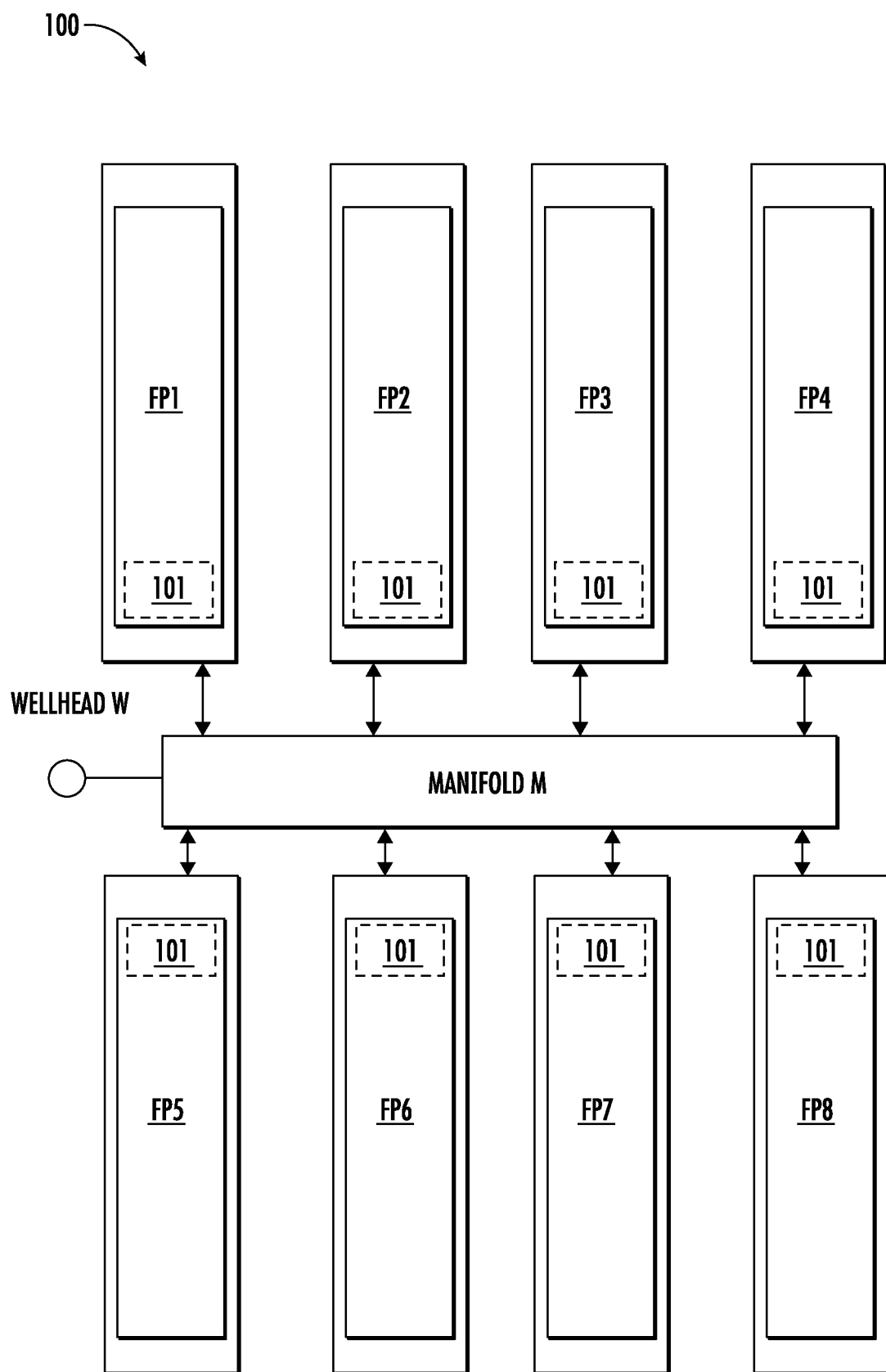
FIG. 1A is a schematic diagram of showing a layout of a fluid pumping system according to an embodiment of the disclosure.

FIG. 1A illustrates a schematic view of a high-pressure, high power, reciprocating positive displacement fluid pumping system 100 according to an embodiment of the disclosure. The diagram of the system 100 shows a typical pad layout for a fracturing pump system, and the system 100 includes a plurality of fracturing or frac pumps or pumping units FP1, FP2, FP3, FP4, FP5, FP6, FP7, FP8 with the pumping units all operatively connected to a manifold M that is operatively connected to a wellhead W. By way of an example, in order to achieve a maximum rated horsepower of 24,000 HP for the pumping system 100, a quantity of eight (8) 3000 horsepower (HP) pumping units may be used. It will be understood that the fluid pumping system 100 may include associated service equipment such as hoses, connections, and assemblies, among other devices and tools. Each of the pumping units FP1, FP2, FP3, FP4, FP5, FP6, FP7, FP8 may include a fluid end block assembly 101.

Figure 1B:
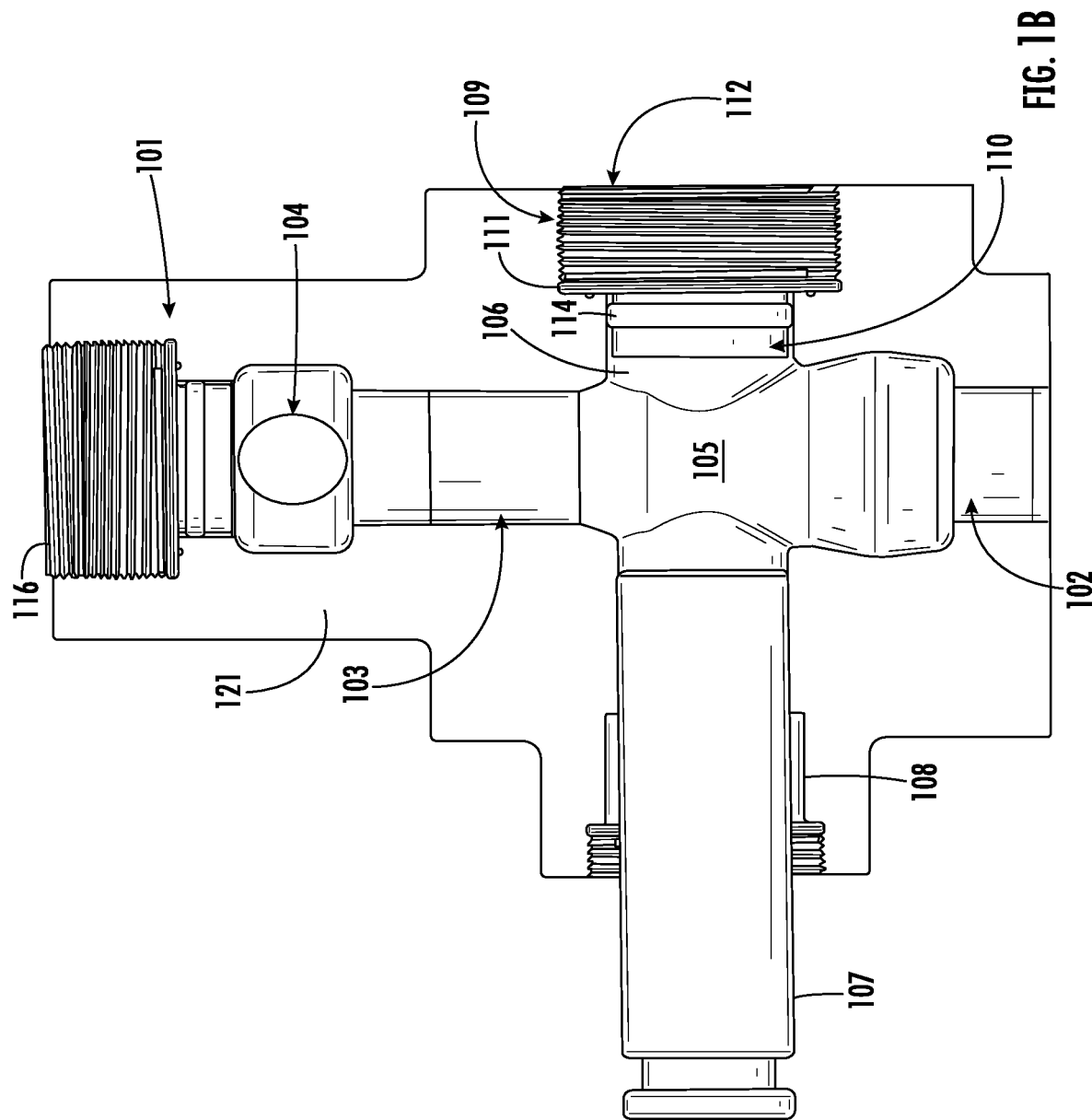
FIG. 1B is an enlarged, sectional view of a fluid end block assembly of the fluid pumping system of FIG. 1A according to an embodiment of the disclosure.
Figure 2B:
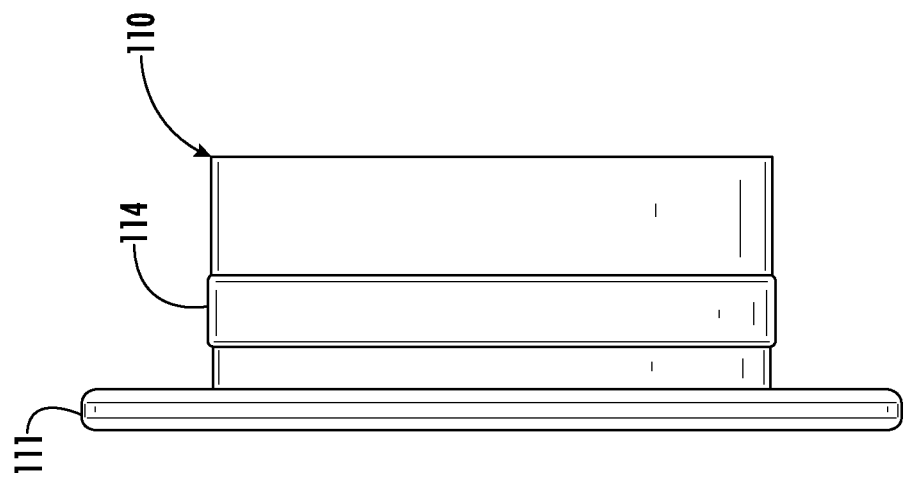
FIG. 2B is a side view of the fluid cover component of FIG. 2A according to an embodiment of the disclosure.
Figure 2A:
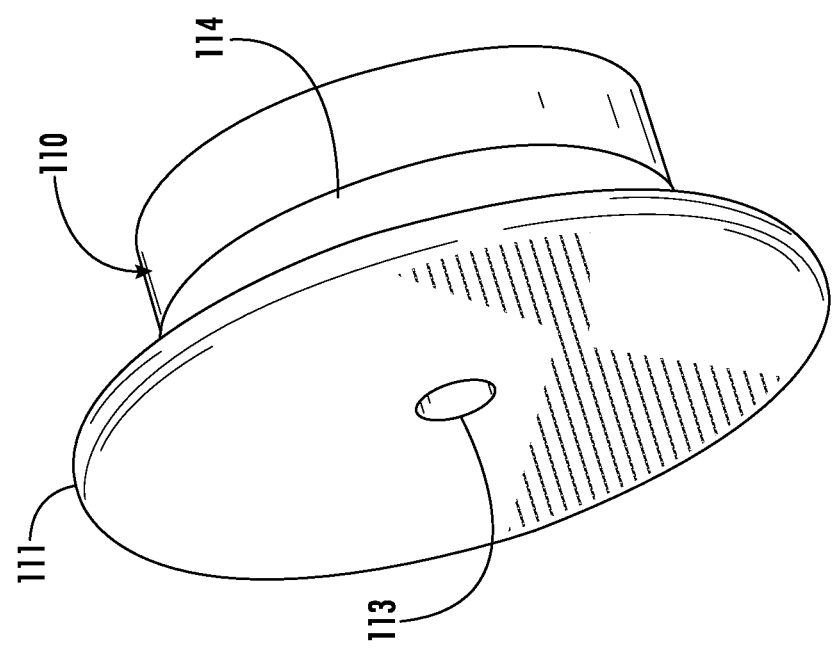
FIG. 2A is a perspective view of a fluid cover component of a conventional fluid cover assembly according to an embodiment of the disclosure.

FIG. 1B illustrates a portion of a fluid end block assembly 101 of the embodiment of the fluid pumping system 100 as shown in a sectional view. In one embodiment, the fluid end block assembly 101 may be in fluid communication with and/or may form a portion of the manifold M. In this regard, one or more of the frac pumps or pumping units FP1, FP2, FP3, FP4, FP5, FP6, FP7, FP8 may be fluidly coupled to the fluid end block assembly 101.

The fluid end block assembly 101, as shown, includes a fluid end block body 121 having intersecting horizontal and vertical bore passages that are each in fluid communication with a fluid end chamber 105 in the fluid end block body 121. The vertical bore passage includes an intake port or suction port 102. The fluid may enter the fluid end block body 121 from an intake source, for example, a fluid supply manifold. The vertical bore passage also includes an outlet port or discharge port 103 through which fluid may exit the fluid end block body 121 or flow to another portion of the fluid end block assembly 101. One or both of the suction port 102 and the discharge port 103 thus collectively provide access to and from the fluid end chamber 105 and may include fluid handling elements or components such as seats, valves, springs, and so forth, as will be understood by those skilled in the art.

The discharge port 103, as shown, includes a discharge bore 104, e.g., an opening or fluid channel, through which pressurized fluid may exit the fluid end block assembly 101 to downstream components of the fluid pumping system coupled to the fluid end block assembly 101. A discharge cover assembly or discharge cap assembly 116 may be coupled to a portion of the discharge port 103, as described further herein.

As shown, a piston/plunger 107 (broadly, "pump member") is positioned in a pump bore 108 along the horizontal bore of the fluid end block assembly 101. The plunger 107 is movable in the pump bore 108, for example, via reciprocating actuation of one or more of the pumping units FP1, FP2, FP3, FP4, FP5, FP6, FP7, FP8, with a forward stroke in the direction of the fluid chamber 105 and that terminates proximate the fluid chamber 105, and a rearward stroke in a direction away from the fluid chamber 105 and opposite the direction of the forward stroke. One or more of the pumping units FP1, FP2, FP3, FP4, FP5, FP6, FP7, FP8 may actuate the plunger 107 to move/reciprocate in the pump bore 108, for example, via a controller or control system, as will be understood by those skilled in the art, that may be in electronic communication with one or more of the pumping units, and which may be operated under manual and/or processor control.

Figure 5:
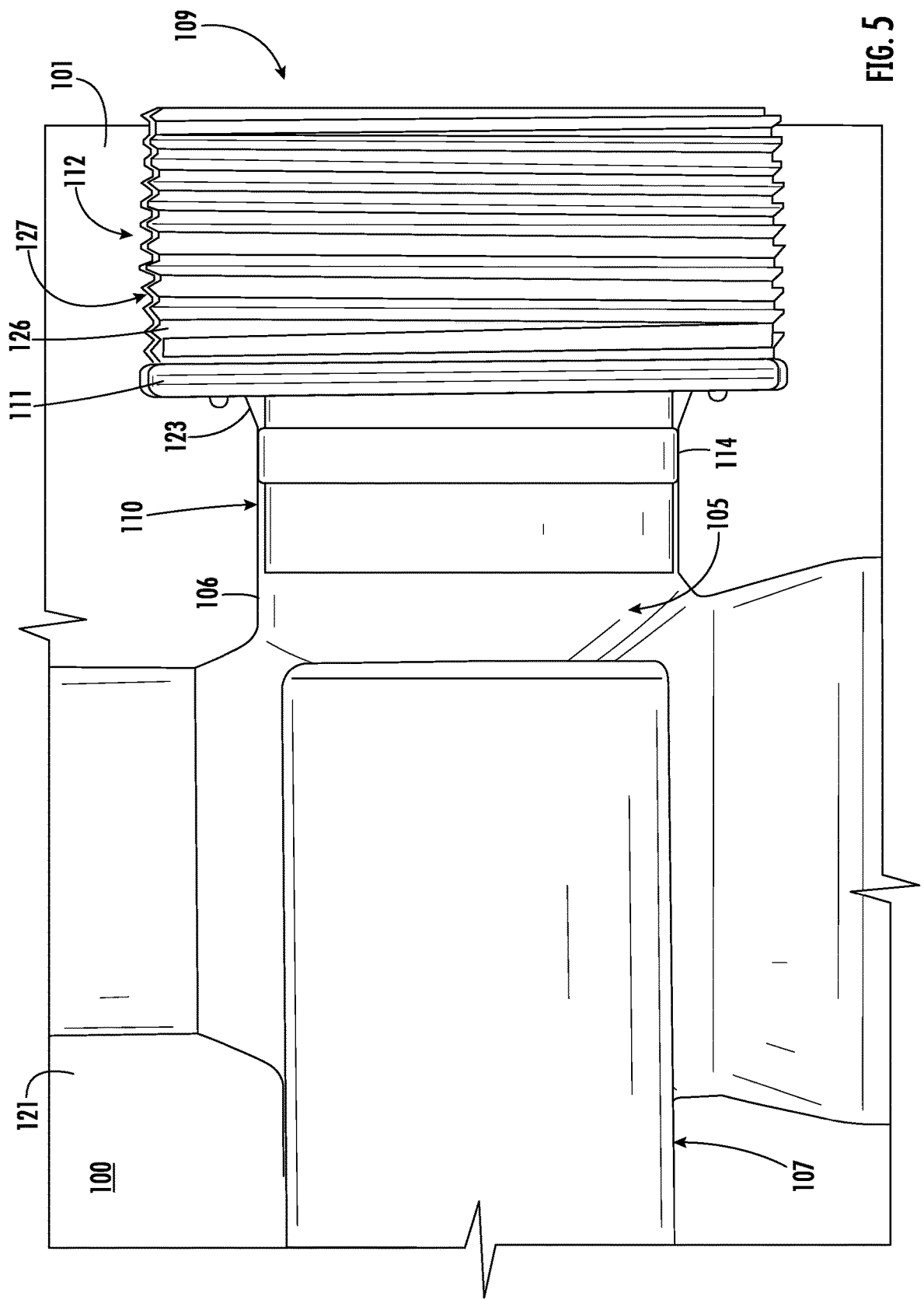
FIG. 5 is another enlarged, sectional view of the fluid end block assembly of FIG. 1B according to an embodiment of the disclosure.

As shown, the forward stroke of the plunger 107 terminates opposite an open end portion 106 of the fluid chamber 105. In one embodiment, the open end portion 106 of the fluid chamber 105 is positioned in a portion of the fluid end block body 121 that includes an oblique or chamfered surface 123 that extends toward an interior threaded portion 127 of the fluid end block body 121 along interior peripheries of the open end portion 106 of the fluid chamber 105 (see FIG. 5).

A fluid cover assembly 109 (broadly, "suction cap assembly" or "suction cover assembly" or "intake cap assembly" or "intake cover assembly") may be sealingly engaged with and coupled to the fluid end block body 121, as described further herein.

An embodiment of the fluid cover assembly 109 may include a fluid cover component 110 having a generally cylindrical body with a flanged head 111 including a tool engagement feature 113 for being engaged by a tool to place, position, help secure to, and/or remove the fluid cover component 110 from the end portion 106 of the fluid chamber 105 (see FIGS. 2A-2B and 3A-3B). In this regard, the fluid cover component 110 may be at least partially received within the end portion 106 of the fluid chamber 105 opposite the reciprocating path of the plunger 107. A sealing member 114, e.g., a rubber or other polymeric annular seal, may be positioned on the cylindrical body of the fluid cover component 110.

The fluid cover component 110 may be at least partially received in the end portion 106 of the fluid chamber 105, and the fluid cover assembly 109 may be mechanically connected to the fluid end block assembly 101 via the mechanical connection of a retainer component 112 to the fluid end block body 121.

Figure 3B:
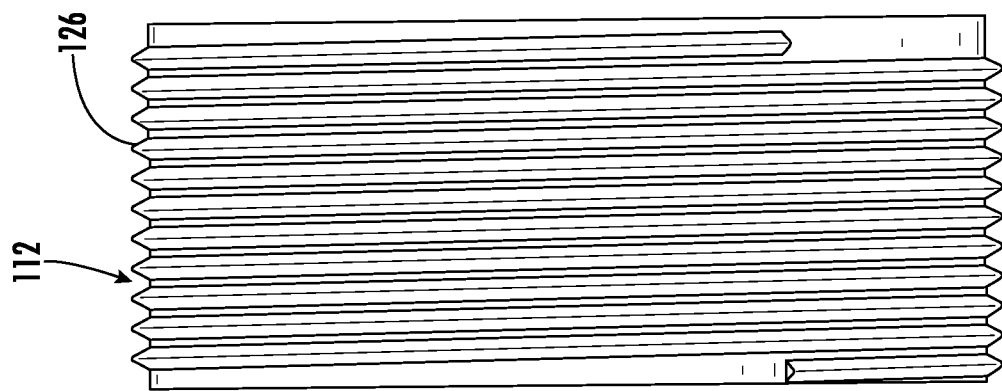
FIG. 3B is a side view of the retainer component of FIG. 3A according to an embodiment of the disclosure.
Figure 3A:
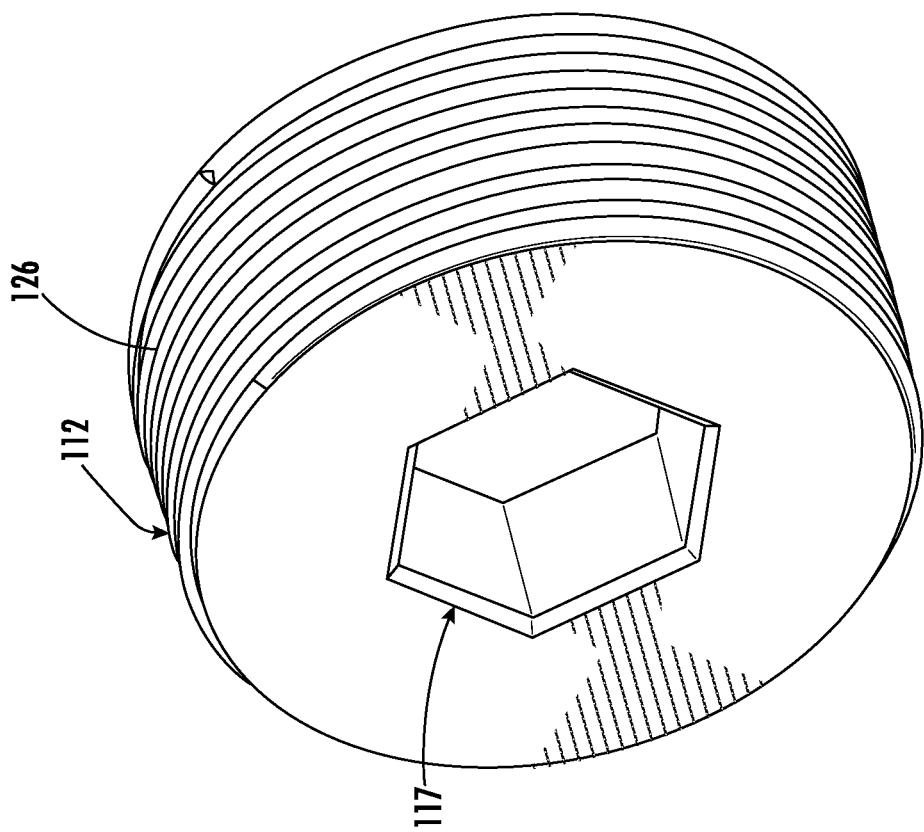
FIG. 3A is a perspective view of a retainer component of a conventional fluid cover assembly according to an embodiment of the disclosure.

The retainer component 112, as shown in FIGS. 3A and 3B, may be a retainer nut or other fastener having a generally cylindrical body with an outer surface that defines a threaded portion 126 that is configured to threadably engage the corresponding interior threaded portion 127 of the fluid end block body 121. In this regard, the retainer component 112 may be threadably advanced into the end portion 106 of the fluid chamber 105 to abut the flanged head portion 111 of the fluid cover component 110, for example, such that an end of the retainer component 112 contacts the head portion of the fluid cover component 112 at an interface, e.g., a discontinuity between the material of the fluid cover component 110 and the material of the retainer component 112. As shown, the retainer component 112 may also define a tool engagement feature 117 for being engaged by a tool to place, position, and/or remove the retainer component 112 from the end portion 106 of the fluid chamber 105.

It will be understood that the discharge cap/cover assembly 116 of the discharge port 103 may have a configuration that is generally similar to the configuration of the fluid cover assembly 109 positioned at the open end portion 106 of the fluid chamber 105 near the suction port 102. The discharge cap/cover assembly 116 of the discharge port 103 may have a different configuration without departing from the disclosure.

Figure 4:
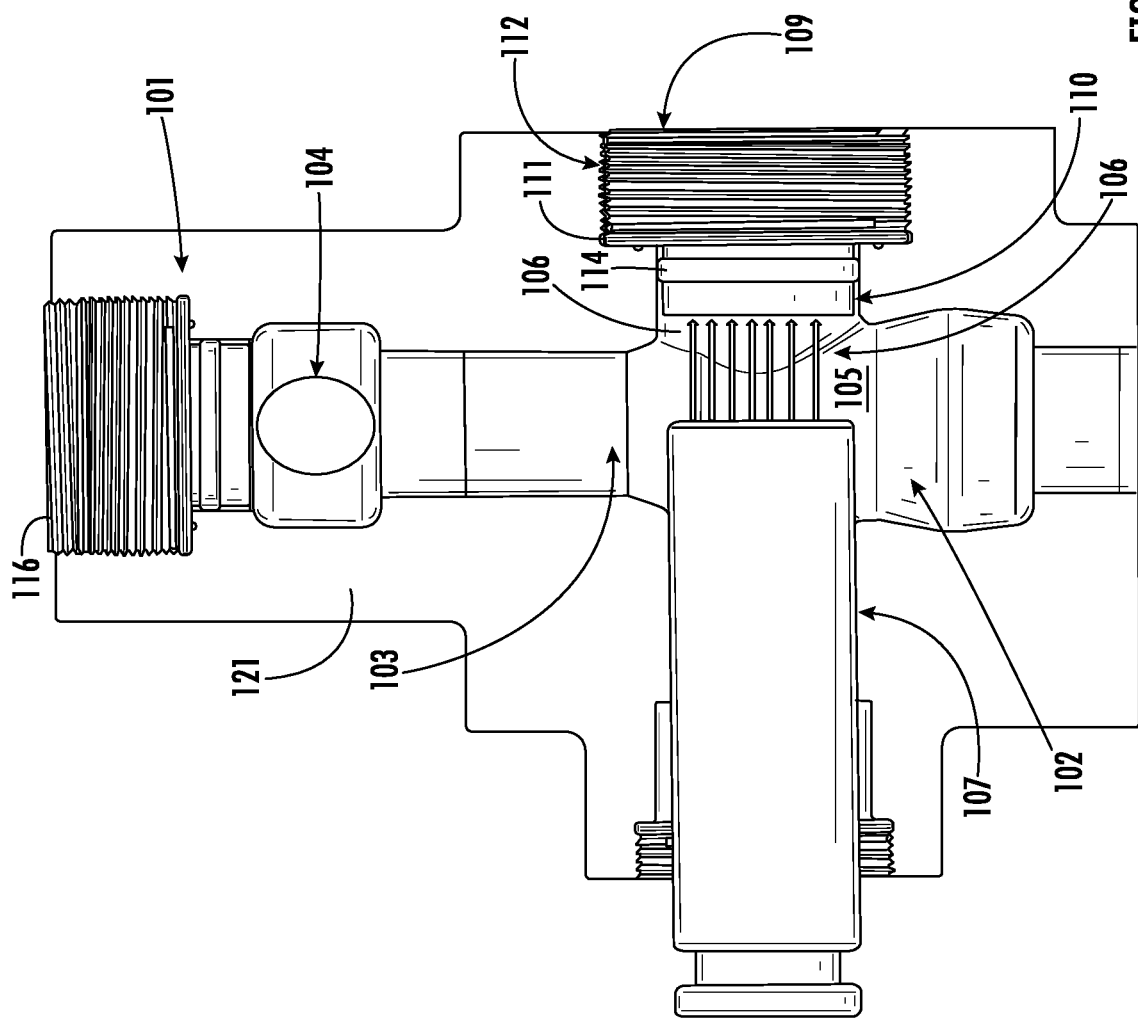
FIG. 4 is an enlarged, sectional view of an operation of the fluid end block assembly of FIG. 1B according to an embodiment of the disclosure.

Referring to FIG. 4, fluid may be delivered via the suction port 102, for example, from a pump suction manifold and valve assembly, into the fluid chamber 105. The fluid in the fluid chamber 105 may be compressed by the plunger 107 upon a compression or delivery stroke, e.g., toward the fluid chamber 105.

In the embodiment illustrated in FIG. 4, the full extension length of the plunger 107 may extend at least partially toward the fluid chamber 105 to compress fluids disposed therein. In this regard, as the plunger 107 commences its delivery or compression stroke, the fluid positioned inside of the fluid end chamber 105 is compressed by the plunger 107 and such compression forces are translated into the surrounding walls of the fluid chamber 105. As the end portion 106 of the fluid chamber 105 is closed by the fluid cover assembly 109 sealingly engaged with the fluid end block body 121, the pressurized fluid in the fluid end chamber 105 flows into the discharge port 103, and out the discharge bore 104.

Following/preceding the above-described compression or delivery stroke of the plunger 107, in an intake or suction stroke, the plunger 107 translates along the pump bore 108 of the fluid end block assembly 101 away from the fluid chamber 105 to create a suction, e.g., negative pressure or vacuum, in the fluid chamber 105 that draws additional fluid into the fluid chamber 105 in preparation for a subsequent compression or delivery stroke.

Figure 6B:
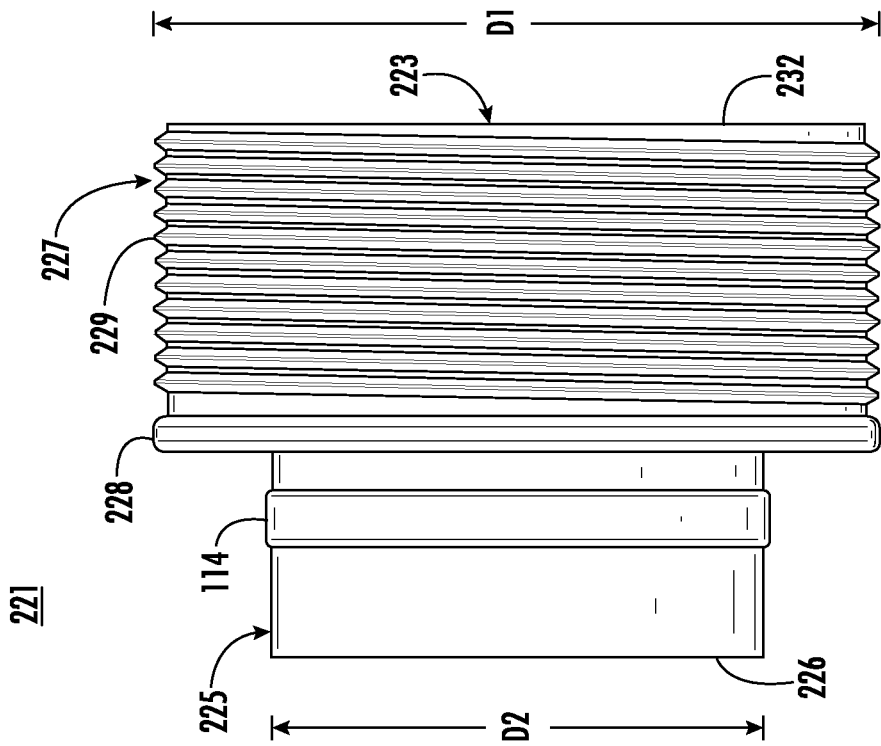
FIG. 6B is a side view of the integrated fluid cover of FIG. 6A according to an embodiment of the disclosure.
Figure 6A:
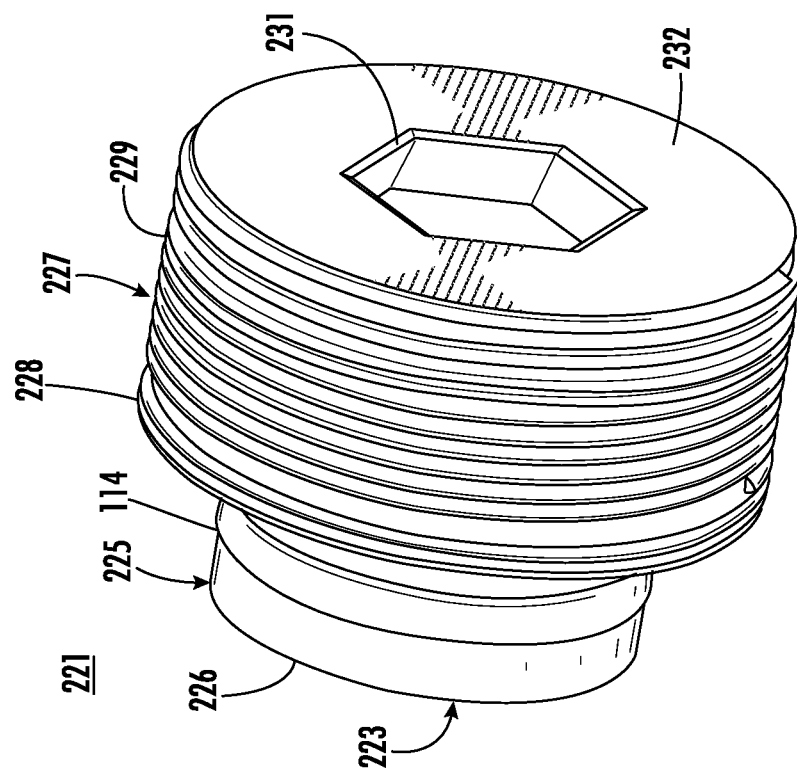
FIG. 6A is a perspective view of an integrated fluid cover according to a first exemplary embodiment of the disclosure.
Figure 6C:
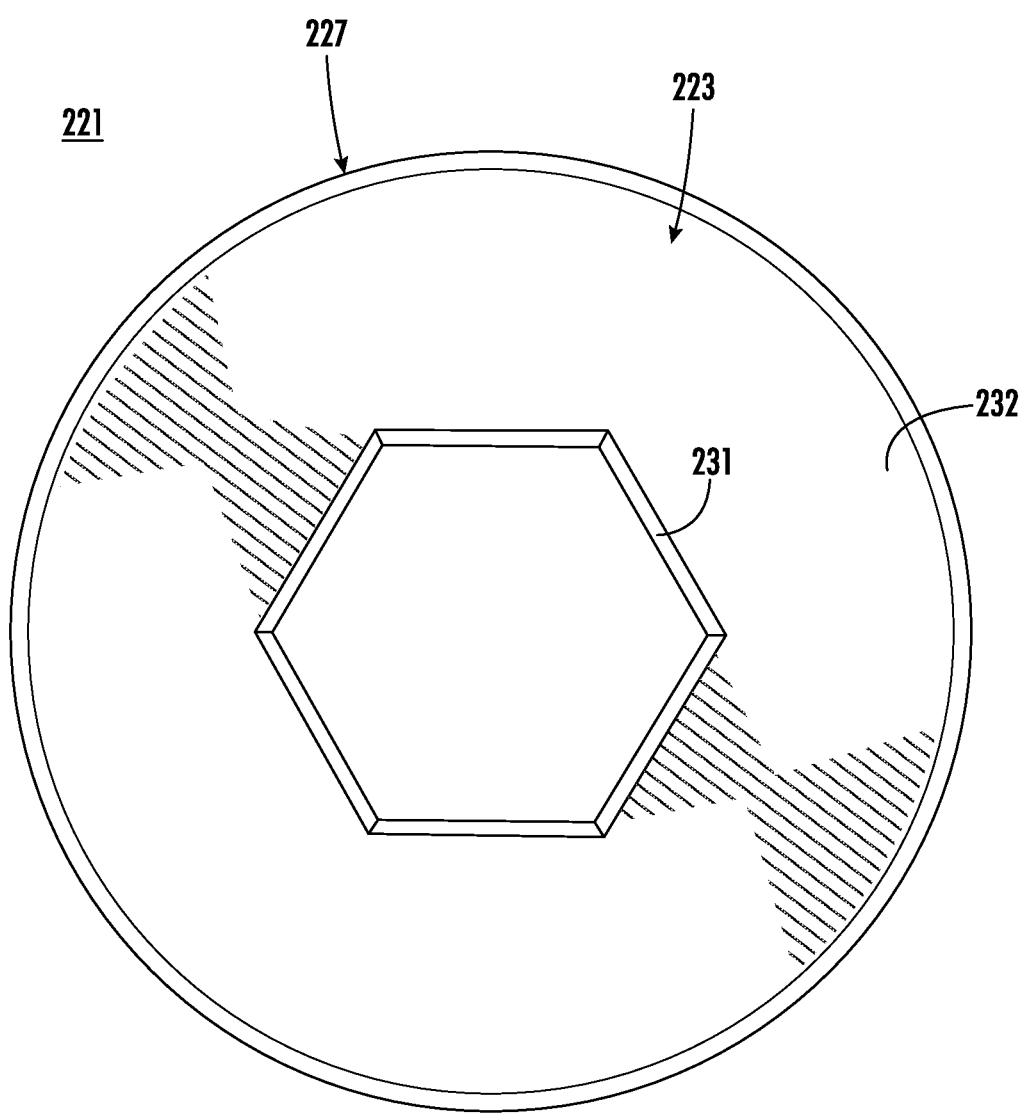
FIG. 6C is a top view of the integrated fluid cover of FIG. 6A according to an embodiment of the disclosure.

Referring to FIGS. 6A-6C, an integrated fluid cover according to a first exemplary embodiment of the disclosure is generally designated 221, and may be used in a fluid pumping system that may be otherwise similar to the fluid pumping system 100 described above.

In the illustrated embodiment, the integrated fluid cover 221 includes a monolithic body 223, e.g., a body monolithically formed of a single continuous piece or block of material that has a unitary configuration so as to be free from any seams or discontinuities that extend from an outer surface of the body 223 to an interior portion of the body 223. It will be understood that the body 223 of the integrated fluid cover 221 may include metallic, polymeric, and/or composite materials.

The body 223 of the integrated fluid cover 221 defines a fluid cover portion 225 (broadly, "first portion") and a retainer portion 227 (broadly, "second portion"). Each of the fluid cover portion 225 and the retainer portion 227 has a generally cylindrical configuration, with the fluid cover portion 225 having a first diameter D1 that is smaller than a second diameter D2 of the fluid cover portion 225.

The fluid cover portion 225 has a generally cylindrical configuration with a free end or distal end 226 facing the fluid chamber 105. The fluid cover portion 225 extends from the distal end 226 to a flange portion 228 of the retainer portion 227. In this regard, the fluid cover portion 225 of the integrated fluid cover 221 may be at least partially received within the end portion 106 of the fluid chamber 105 of the fluid end block assembly 101.

As shown, the flange portion 228 of the retainer portion 227 extends radially outwardly from the fluid cover portion 225. The retainer portion 227 also includes a threaded portion 229 extending away from the flange portion 228 and that is configured to engage the interior threaded portion 127 of the fluid end block body 121 to mechanically connect to the fluid end block body 121 as described above. In one embodiment, the flange portion 228 of the retainer portion 227 may extend radially outwardly from the threaded portion 229 so as to form a protrusion or protuberance along the outer surface of the retainer portion 227.

As shown, the seal member 114 (broadly, "first seal member") may be positioned on the fluid cover portion 225 of the integrated fluid cover 221 between the distal end 226 and the flange portion 228 of the retainer portion 227. In this regard, when the fluid cover portion 225 of the integrated fluid cover 221 is at least partially received in the end portion 106 of the fluid chamber 105, the seal member 114 may be positioned to sealingly engage interior surfaces of the fluid end block body 121. The seal member 114 may align or center the fluid cover portion 225 within the end portion 106 of the fluid chamber 105.

As also shown, the body 223 of the integrated fluid cover 221 defines a tool engagement feature 231 at a free end or proximal end surface 232 of the retainer portion 227. The tool engagement feature 231 may be, for example and without limitation, a polygonal (e.g., hexagonal) recess having a configuration complementary to that of an insertion or removal or securing tool, such as an Allen wrench or other driver when positioned to secure the integrated fluid cover 221. Optionally, the tool engagement feature may have a different configuration, for example and without limitation, a protrusion, without departing from the disclosure.

In this regard, rotation of the integrated fluid cover 221 via engagement of a tool with the tool engagement feature 231 may cause rotation of both the fluid cover portion 225 and the retainer portion 227 of the integrated fluid cover 221 due to the monolithic construction of the body 223 of the integrated fluid cover 221. Such a configuration may obviate and reduce the number of tools required for insertion, removal, and other maintenance of a fluid cover in which, for example, a retainer portion and a fluid cover portion are separate components.

Furthermore, the aforementioned monolithic construction of the body 223 of the integrated fluid cover 221 may provide a higher mass single body as compared to the bodies of a fluid cover portion and a retainer portion provided as separate components of a fluid cover assembly. In this regard, the integrated fluid cover 221 provides enhanced material integrity, durability, and fatigue resistance in high pressure fluid environments.

For example, in a conventional fluid cover assembly that includes a separately coupled fluid cover portion and retainer portion, cyclic high fluid pressures produced in a fluid pump system may result in a water hammer effect in which impacts the fluid cover portion and which is translated towards the retainer portion. These fluid pulsations may be influenced by factors such as pump operating pressure, pump crankshaft rotation speed, suction and discharge valve efficiency, and effective fluid end chamber fill volume per plunger stroke. The fluid pulses/forces thus produce a constant vibration and wear on components of the fluid block assembly 101, and may cause relative movement of the fluid cover portion and the retainer portion, which may result, for example, in wearing down or away of threaded portions or other coupling features that may create a clearance gap (see FIG. 5) between the fluid cover portion and the separate retainer portion, backing out or disengagement of the retainer portion from an end portion of a fluid end block, the loss of seal integrity between the fluid cover portion and the end portion of the fluid end block that may lead to leakage of fluids from the fluid end block, etc.

Accordingly, the disclosed integrated fluid cover 221 is resistant to wear and failure produced in the cyclic high pressure fluid environments in a fluid end block assembly 101 so as to reduce damage (e.g., wash, wear, cracking, etc.), reduce maintenance cycles and downtimes, minimize consumable components for the fluid end block assembly 101, ensure the maintenance of proper sealing contact with surfaces of the fluid end block assembly 101, and reduce leakage from the fluid end block assembly 101.

In addition, because the tool engagement feature 231 may be engaged to both position and seat the fluid cover portion 225 in the end portion 106 of the fluid end block assembly 101 as well as engage/couple the retainer portion 227 with the fluid end block body 121, the number of tools employed for installation/maintenance of components of the fluid end block assembly 101 may be reduced, as well as obviating the need to align a separate fluid cover portion and a retainer portion.

Further, constructing or manufacturing the fluid cover portion 225 and the retainer portion 227 into a single monolithic body of the fluid cover 221 may increase resistance to backing out and/or rotation of the fluid cover 221 during the rugged environment associated with operation of a fluid end. For example, with a separate fluid cover portion and retainer portion (see FIGS. 2A-3B), the fluid cover portion is subject to translation forces towards and away from the retainer portion as a result of what is known as the water hammer effect as will be understood by those skilled in the art, and the retainer portion is subject to rotational forces as a result of the retainer portion engaging the flange thereof. In contrast, the monolithic body of the fluid cover 221 increases a mass resisting the water hammer effect. In addition, as the retainer portion 227 and the fluid cover portion 225 are monolithically formed together, the water hammer effect may be reduced by eliminating movement between the retainer portion 227 and the fluid cover portion 225. Additionally, the frictional engagement between the monolithic fluid cover 221 may be increased to further resist the water hammer effect. For example, the seal member 114 frictionally engages the inner surface of the fluid end block body 121 which may increase resistance to rotation of the fluid cover portion 225 relative to the fluid end block body 121 when compared to a non-monolithically formed fluid cover. This engagement further may increase a service life of the fluid cover 221 and/or the fluid end block body 121 by reducing the number of component parts and by reducing the risk of failure of this particular component part due to its construction as illustrated and described in the associated embodiments.

Figure 7A:
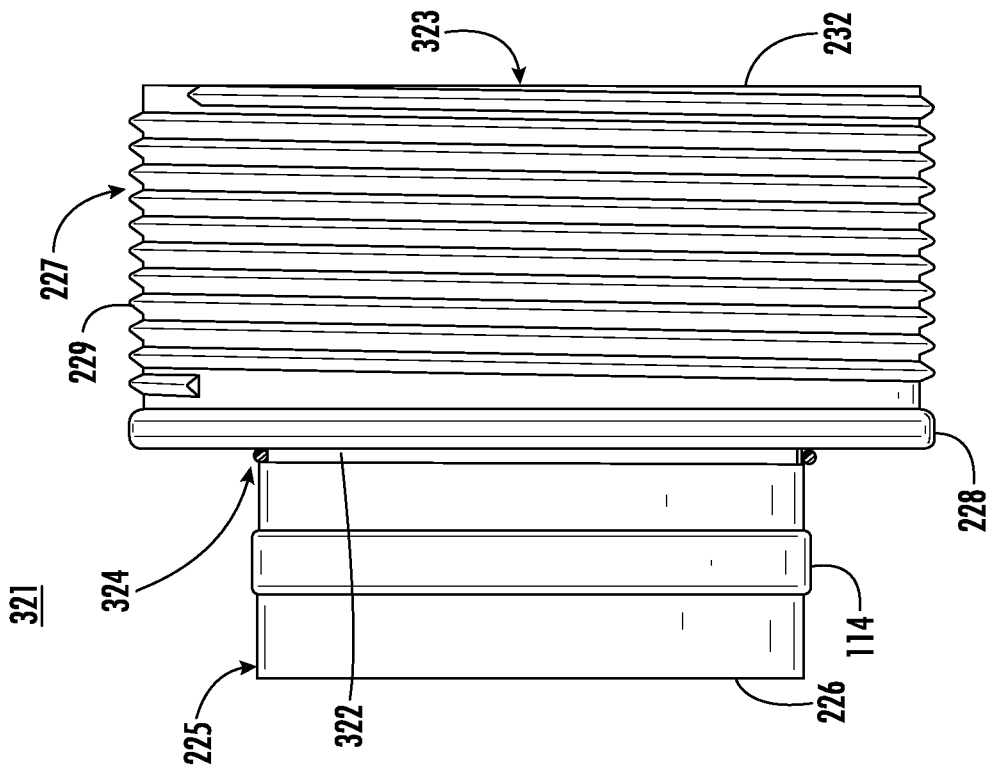
FIG. 7A is a side view of an integrated fluid cover according to a second exemplary embodiment of the disclosure.
Figure 7B:
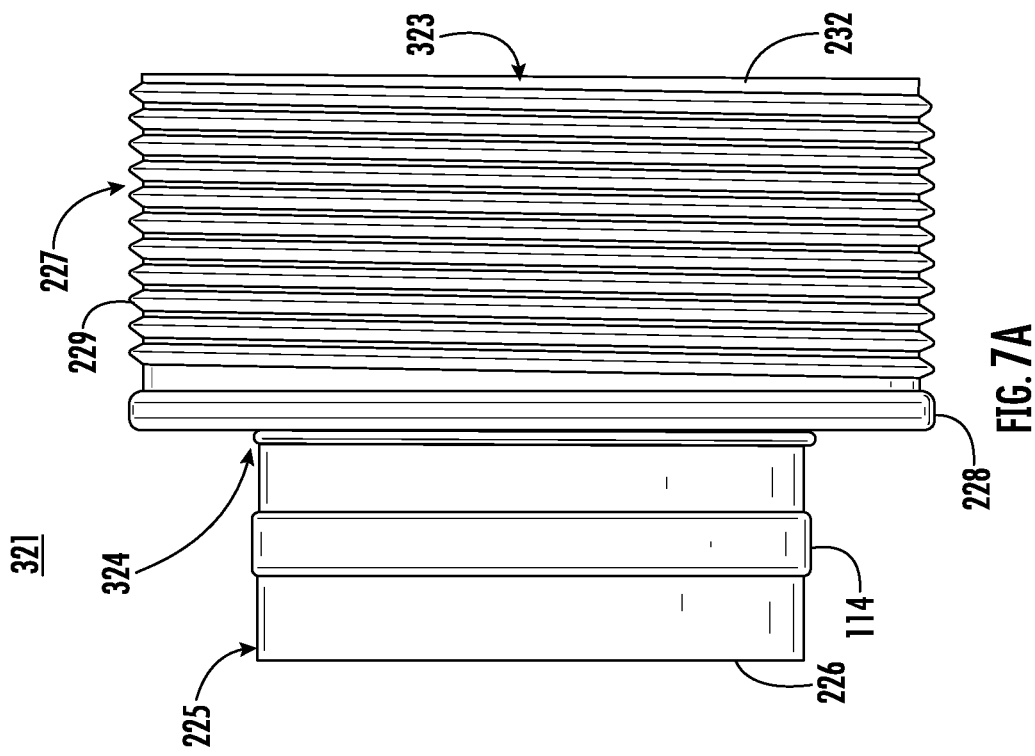
FIG. 7B is another side view of the integrated fluid cover of FIG. 7A, with a seal member shown in cross-section according to an embodiment of the disclosure.

Referring to FIGS. 7A and 7B, an integrated fluid cover according to a second exemplary embodiment of the disclosure is generally designated 321, and may be sealably coupled to the fluid end block assembly 101 of a fluid pumping system 300 that may be otherwise similar to the fluid pumping systems described above, e.g., system 100. The integrated fluid cover 321 may have one or more features that are substantially similar to those described above with regard to the integrated fluid cover 221, and like or similar features are designated with like or similar reference numerals.

The integrated fluid cover 321 has a body 323 that is substantially similar to the body 223 of the integrated fluid cover 221, except that the body 321 defines a machined or molded annular recess or groove 322 along the fluid cover portion 225 adjacent the flange portion 228 of the retainer portion 227 and for at least partially receiving a seal member 324 (broadly, "second seal member") therein. The seal member 324 may be a flexible and/or resilient member, such as a polymeric (e.g., rubber) ring, for example and without limitation, an O-ring.

In this regard, the annular groove 322 may provide for an arrangement of the seal member 324 about the fluid cover portion 225 of the integrated fluid cover 321 that has a low or minimized profile, e.g., such that a minimal portion of the seal member 324 extends above the annular groove 322. Accordingly, the annular groove 322 and seal member 324 cooperate to provide an arrangement of the seal member 324 that enhances a fluid-resistant seal against the fluid end block body 121, but does not interfere with proper placement or receipt of the fluid cover portion 225 in the end portion 106 of the fluid chamber 105.

Furthermore, and with additional reference to FIG. 8, when the fluid cover portion 225 of the integrated fluid cover 321 is at least partially received with the end portion 106 of the fluid chamber 105, the seal member 324 may be compressed to a reduced profile, which may also have the effect of enhancing the sealing engagement of the seal member 324 against the fluid end block body 121. As shown in FIG. 8, the flange portion 228 of the integrated fluid cover 321 is positioned to seat against an internal surface 128 of end portion 106 of the fluid chamber 105. Specifically, the seal member 324 may be configured to engage the chamfered surface 123 of the fluid end block body 121 such that the seal member 324 fills space or at least some of the interstitial space between the retainer portion 225 and the fluid end block body 121 as will be understood by those skilled in the art.

Figure 9:
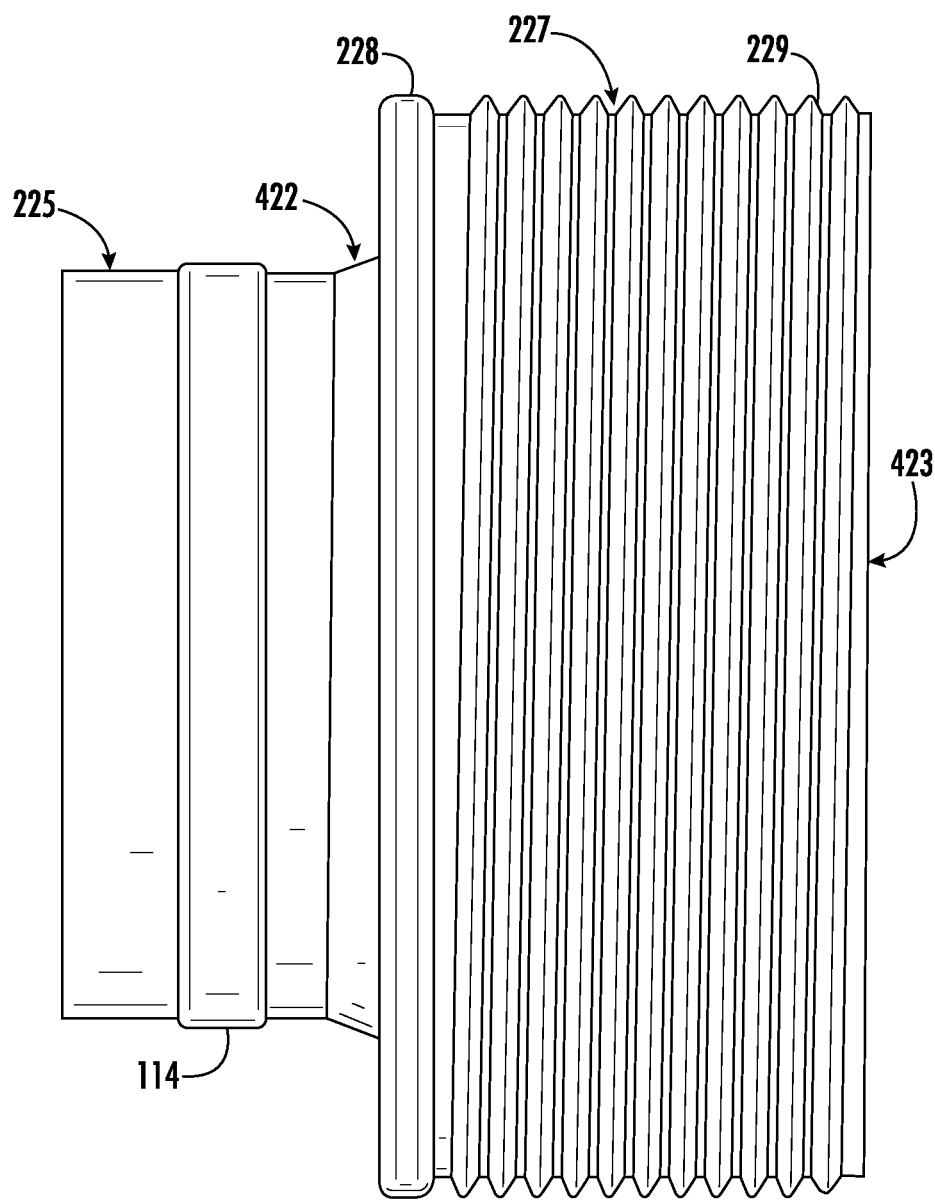
FIG. 9 is a side view of an integrated fluid cover according to a third exemplary embodiment of the disclosure.

Referring now to FIG. 9, an integrated fluid cover according to a third exemplary embodiment of the disclosure is generally designated 421, which may be sealably coupled to the fluid end block assembly 101 of a fluid pumping system 400 that may be otherwise similar to the fluid pumping systems described above, e.g., systems 100, 300. The integrated fluid cover 421 may have one or more features that are substantially similar to those described above with regard to the integrated fluid covers 221, 321 and like or similar features are designated with like or similar reference numerals.

The integrated fluid cover 421 has a body 423 that is substantially similar to the body 223 of the integrated fluid cover 221, except that the body 421 includes a neck portion or shoulder 422 extending from a surface of the fluid cover portion 225 to the flange portion 228 of the retainer portion 227. In this regard, the shoulder 422 of the integrated fluid cover 421 has a tapered configuration that provides an oblique annular surface positioned between the fluid cover portion 225 and the retainer portion 227 to substantially surround the fluid cover 421. The oblique annular surface of the shoulder 422 increases in diameter as the shoulder 422 extends towards the flange portion 228 of the retainer portion 227.

Figure 10:
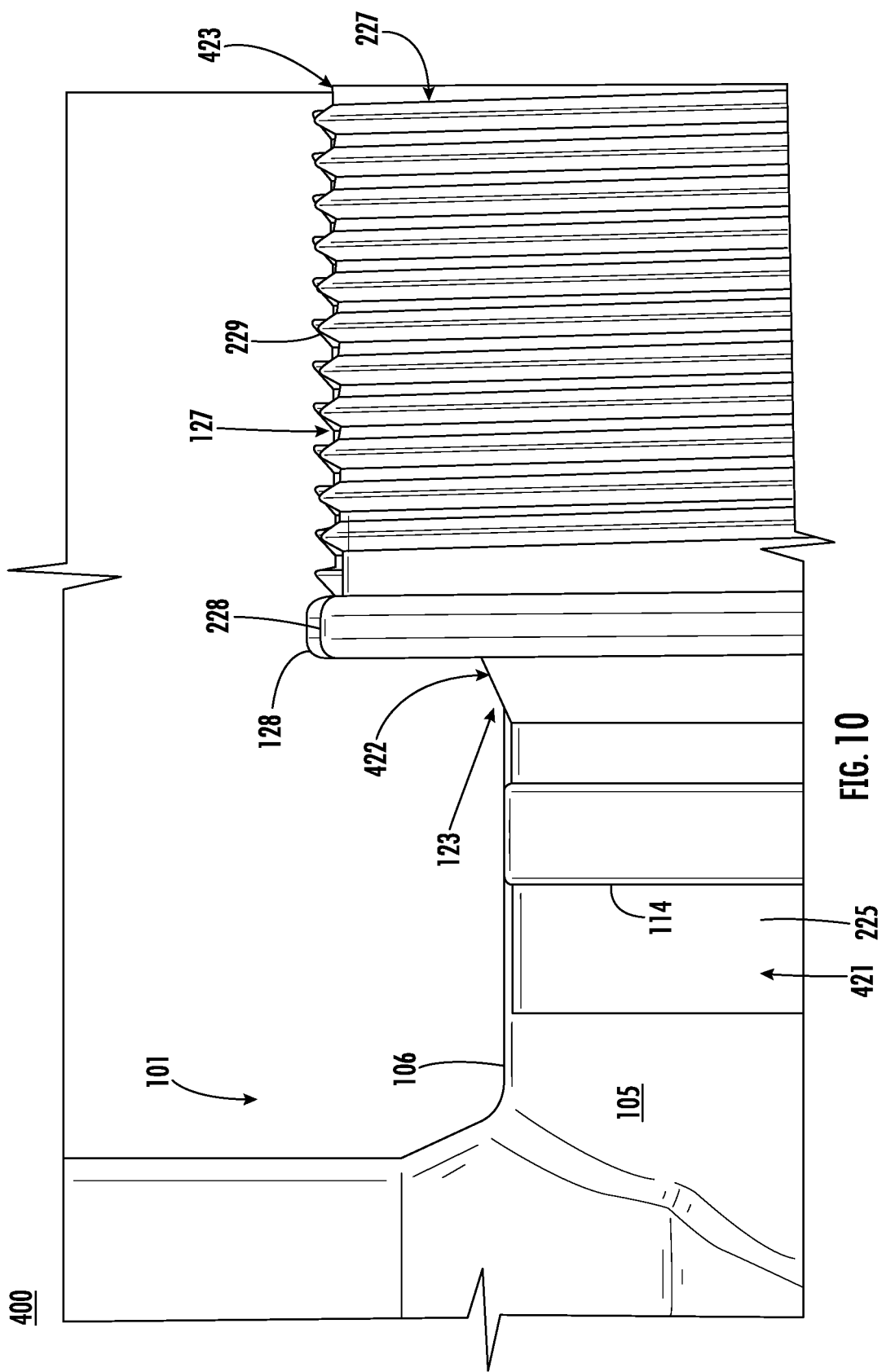
FIG. 10 is a sectional view of the integrated fluid cover of FIG. 9 sealably coupled with a fluid end block assembly of a fluid pumping system according to an embodiment of the disclosure.

Accordingly, and with additional reference to FIG. 10, when the fluid cover portion 225 of the integrated fluid cover 421 is at least partially received with the end portion 106 of the fluid chamber 105, the shoulder 422 may sealingly engage the chamfered surface 123 in a frictional and/or wedged arrangement so as to provide an enhanced seal of the integrated fluid cover 421 against the fluid end block body 121 that may resist fluid leakage from the fluid chamber 105. In one embodiment, both the fluid end block body 101 and at least the shoulder 422 of the integrated fluid cover 421 may be comprised of metal such that the interface of the shoulder 422 with the outer edge of the end portion 106 of the fluid chamber is a metal-to-metal interface that provides an enhanced seal. In some embodiments, the shoulder 422 may interact with the chamfered surface 123 to align or center the integrated fluid cover 421 with the end portion 106 of the fluid chamber 105.

This is a continuation of U.S. Non-Provisional application Ser. No. 15/929,652, filed May 14, 2020, titled "COVER FOR FLUID SYSTEMS AND RELATED METHODS," which claims priority to and the benefit of, U.S. Provisional Application No. 62/704,462, filed May 12, 2020, titled "COVER FOR FLUID SYSTEMS AND RELATED METHODS," and U.S. Provisional Application No. 62/704,476, filed May 12, 2020, titled "COVER FOR FLUID SYSTEMS AND RELATED METHODS," the disclosures of which are incorporated herein by reference in their entireties.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A high-pressure, high power, reciprocating positive displacement fluid pumping system, the system comprising:
   a high-pressure, high power, reciprocating positive displacement pump comprising a pump plunger;
   a fluid end block assembly including a fluid end block body, a suction port, a discharge port, a pump bore positioned in and extending through the fluid end block body, and a fluid chamber positioned in the fluid end block body and in fluid communication with each of the suction port, the discharge port, and the pump bore, the fluid chamber having an open end portion extending to an opening of the fluid end block body, the open end portion having an inner cylindrical wall and an interior chamfered surface positioned between the inner cylindrical wall and the opening, and the pump plunger being movably positioned in the pump bore to pressurize one or more fluids in the fluid chamber;
   a fluid cover including:
      a monolithic body having a longitudinal axis and including:
         a first end,
         a second end opposite the first end along the longitudinal axis,
         a first portion having an outer cylindrical surface that extends axially from the first end, the outer cylindrical surface having a first outer diameter and including an annular groove, and
         a second portion extending axially from the first portion to the second end, the second portion having a second outer diameter greater than the first outer diameter and including:
            a threaded portion mechanically connected to the fluid end block body, and
            a flange portion positioned axially between the threaded portion and the annular groove;
      at least one first seal member positioned on the outer cylindrical surface of the first portion such that the outer cylindrical surface is spaced away from the inner cylindrical wall of the open end portion by the at least one first seal member and such that the at least one first seal member sealingly is engaged with the inner cylindrical wall; and
      a second seal member at least partially received in the annular groove such that the second seal member is compressed against the interior chamfered surface.

2. The fluid pumping system of claim 1, wherein the at least one first seal member is positioned between the flange portion and the first end of the monolithic body.

3. The fluid pumping system of claim 1, wherein the fluid open end portion has a threaded interior surface positioned between the opening and the chamfered interior surface, wherein the threaded portion engages the threaded interior surface to secure the fluid cover to the fluid end block assembly, and wherein the second end of the monolithic body has a tool engagement feature to engage with a securing tool when positioned to secure the fluid cover.

4. The fluid pumping system of claim 1, wherein the second seal member and the annular groove are configured such that a portion of the second seal member extends radially outward beyond the first outer diameter of the first portion to provide a fluid-resistant seal against the interior chamfered surface of the fluid end block body.

5. A fluid cover for being sealably engaged with a fluid end block assembly of a high-pressure, high power, reciprocating positive displacement fluid pumping system, the fluid cover comprising:
   a monolithic body having a longitudinal axis and including:
      a first end,
      a second end opposite the first end along the longitudinal axis,
      a first portion having an outer cylindrical surface extending axially from the first end, the outer cylindrical surface having a first outer diameter, the outer cylindrical surface configured to be received in an interior portion of an open end portion of a fluid chamber of the fluid end block assembly, the open end portion extending to an opening of the fluid end block assembly and having an interior chamfered surface positioned between the interior portion and the opening, and the outer cylindrical surface having an annular groove;
      a second portion extending axially from the first portion to the second end, the second portion having a second diameter greater than the first diameter and including:
         a threaded portion for being mechanically connected to the fluid end block assembly, and
         a flange portion between the threaded portion and the annular groove of the first portion;
   at least one first seal member positioned on the outer cylindrical surface of the first portion such that the at least one first seal member sealingly is engaged with the interior portion; and
   a second seal member at least partially received in the annular groove such that the second seal member is configured to engage with the interior chamfered surface of the open end portion.

6. The fluid cover of claim 5, wherein the at least one first seal member is positioned between the flange portion and the first end.

7. The fluid cover of claim 5, wherein the second seal member and the annular groove are configured such that a portion of the second seal member extends radially outward beyond the first outer diameter of the first portion to provide a fluid-resistant seal against an interior chamfered surface of the fluid end block assembly.

8. The fluid cover of claim 5, wherein the threaded portion is configured to engage with a threaded interior surface of the fluid end block assembly that is positioned between the interior chamfered surface and the opening to secure the fluid cover in the fluid end block assembly, and wherein the second end of the monolithic body includes a tool engagement feature configured to be engaged by a securing tool when positioned to secure the fluid cover.

9. A method of operating a high-pressure, high power, reciprocating positive displacement fluid pumping system, the method comprising:
   obtaining a fluid end block assembly including a fluid end block body, a suction port, a discharge port, a pump bore positioned in and extending through the fluid end block body, and a fluid chamber positioned in the fluid end block body and in fluid communication with each of the suction port, the discharge port, and the pump bore, the fluid chamber having an open end portion that extends to an opening of the fluid end block body, the open end portion having an inner cylindrical wall and an interior chamfered surface such that the interior chamfered surface is positioned between the inner cylindrical wall and the opening;
   obtaining a high-pressure, high power, reciprocating positive displacement pump comprising a pump plunger;

fluidly connecting the pump to the fluid end block assembly;
inserting a fluid cover at least partially into the open end portion so as to align the fluid cover with the fluid end block body, the fluid cover including:
  a monolithic body having a longitudinal axis and including:
    a first portion and a second portion, the first portion having an outer cylindrical surface that extends from an end of the monolithic body toward the second portion, the outer cylindrical surface having a first outer diameter and an annular groove,
    the second portion having a second outer diameter greater than the first outer diameter, the second portion including:
      an end surface of the fluid cover, the end surface including a tool engagement feature for engaging the tool engagement feature with a tool to secure the fluid cover to the fluid end block body,
      a threaded portion, and
      a flange portion between the threaded portion and the annular groove, and
    at least one first seal member arranged on the outer cylindrical surface of the first portion,
    a second seal member at least partially received in the annular groove;
sealingly engaging the at least one first seal member with the inner cylindrical wall such that the outer cylindrical surface is spaced away from the inner cylindrical wall by the at least one first seal member;
sealingly engaging the second seal member with the interior chamfered surface;
mechanically connecting the threaded portion to the fluid end block body; and
operating the pump, the operating the pump comprising moving the pump plunger in the pump bore to pressurize one or more fluids in the fluid chamber.

10. The method of operating the fluid pumping system of claim 9, wherein inserting the fluid cover includes engaging the at least one first seal member with the inner cylindrical wall to align the fluid cover with the open end portion.

11. The method of operating the fluid pumping system of claim 9, further comprising providing a fluid-resistant seal against the interior chamfered surface of the fluid end block body with the second seal member.

12. The method of operating the fluid pumping system of claim 9, wherein the fluid end block body has a threaded interior surface positioned between the interior chamfered surface and the opening, and wherein the mechanically engaging comprising engaging the threaded portion of the fluid cover with the threaded interior surface to secure the fluid cover in the fluid end block body.

13. The method of claim 9, wherein the end of the monolithic body is positioned within the open end portion, and wherein sealingly engaging the at least one first seal member with the inner cylindrical wall includes sealingly engaging the at least one first seal member with the inner cylindrical wall such that the outer cylindrical surface is spaced away from the inner cylindrical wall at the end of the monolithic body by the at least one first seal member.

* * * * *